United States Patent Office 3,576,019
Patented Apr. 20, 1971

3,576,019
FLUOROCARBON OIL-REPELLENCY AGENTS
Richard F. Sweeney, Randolph Township, Morris County, and Alson K. Price, Morristown, N.J., assignors to Allied Chemical Corporation, New York, N.Y.
No Drawing. Filed Aug. 1, 1968, Ser. No. 749,351
Int. Cl. C09f 7/00
U.S. Cl. 260—404.5      9 Claims

ABSTRACT OF THE DISCLOSURE

Fluorinated amide oil-repellency agents for fibrous materials as textiles and paper have the structural formula $$R_f-\overset{O}{\overset{\|}{C}}-NH(C_xH_{2x}N)_y-C_xH_{2x}NH-Z$$
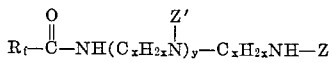

wherein $R_f$ is a fluorine-containing alkyl radical having a terminal fluoroisoalkoxyfluoroalkyl group; $x$ and $y$ are integers from 2 to 6 and 1 to 4, respectively; Z is H, alkyl, hydroxyalkyl or an acyl radical of the formula —$COR_f$ wherein $R_f$ is as described above; and $Z'$ is H, alkyl, hydroxyalkyl, the above-described acyl radical or a radical of the formula —$C_xH_{2x}NHZ$ wherein Z is as described above.

BACKGROUND OF THE INVENTION

This invention relates to novel fluorocarbon derivatives. More particularly, this invention is concerned with fluorinated amide compounds, valuable as oil-repellency agents.

Accordingly, it is an object of the present invention to provide novel fluorocarbon compounds.

It is another object of the present invention to provide fluorinated amide compounds having oil-repellency properties.

These and other objects are apparent from the following description.

DESCRIPTION OF THE INVENTION

The novel fluorinated amide compounds of the present invention have the structural formula $$R_f-\overset{O}{\overset{\|}{C}}-\overset{H}{\overset{|}{N}}-(C_xH_{2x}N)_y-C_xH_{2x}-\overset{H}{\overset{|}{N}}-Z \quad (I)$$

wherein (a) $R_f$ is a radical having the formula

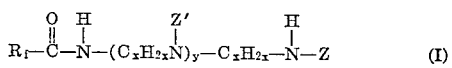
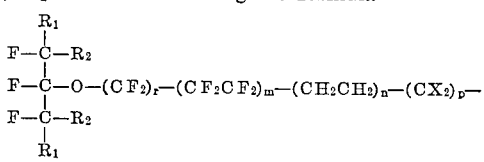

wherein
(i) $R_1$ and $R_2$ are fluorine or are fluoroalkyl groups, or, when taken together, are fluoroalkylene groups forming a cycloaliphatic structure, which $R_1$ and $R_2$ groups may each have from 1 to 9 carbon atoms, provided that not more than three of the $R_1$ and $R_2$ groups may be fluoroalkyl groups,
(ii) $m$ and $n$ are each integers of from 0 to 20, with the proviso that the sum of $m$ and $n$ is from 0 to 20, and provided further that when $r$ is 0, $m$ is at least 1,
(iii) X is selected from the group consisting of hydrogen and fluorine, with the proviso that when $n$ is greater than 0, then X is always hydrogen,
(iv) $p$ is 0 or 1,
(v) $r$ is 0 or 1, with the proviso that when the sum of $m$, $n$ and $p$ is greater than 0, then $r$ is always 0, (b) $x$ is an integer from 2 to 6,
(c) $y$ is an integer from 1 to 4,
(d) Z is a member selected from the group consisting of
  (i) hydrogen,
  (ii) alkyl having from 1 to 6 carbon atoms,
  (iii) a radical having the formula —ROH wherein R is a divalent alkylene bridging group containing from 1 to 6 carbon atoms, and
  (iv) an acyl radical having the formula

wherein $R_f$ has the afore-stated meaning, and
(e) $Z'$ which may be the same or different in different

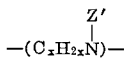

groups, is a member selected from the group consisting of
  (i) hydrogen,
  (ii) alkyl having from 1 to 6 carbon atoms,
  (iii) a radical having the formula —ROH wherein R has the afore-stated meaning,
  (iv) an acyl radical having the formula

wherein $R_f$ has the afore-stated meaning, and
(v) a radical having the formula

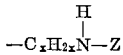

wherein $x$ and Z have the afore-stated meanings.

The novel fluorocarbon derivatives of the present invention may be prepared by reacting a polyalkylene polyamine compound corresponding to the general formula

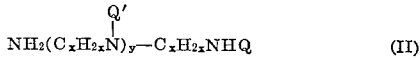
$$NH_2(C_xH_{2x}N)_y-C_xH_{2x}NHQ \quad (II)$$

wherein $x$ and $y$ have the afore-stated meanings; wherein Q is selected from the group consisting of hydrogen, alkyl having from 1 to 6 carbon atoms, and a radical having the formula —ROH wherein R is a divalent alkylene bridging group containing from 1 to 6 carbon atoms; and wherein $Q'$ is selected from the group consisting of hydrogen, alkyl having from 1 to 6 carbon atoms, a radical having the formula —ROH wherein R is a divalent alkylene bridging group containing from 1 to 6 carbon atoms, or an aminoalkyl radical having the formula $$-C_xH_{2x}NHQ$$

wherein $x$ and Q have the afore-stated meanings, with a fluorinated carboxylic acid reactant having a terminal fluoroisoalkyloxy alkyl group. This fluorinated carboxylic acid reactant comprises acids having the formula

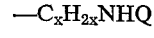
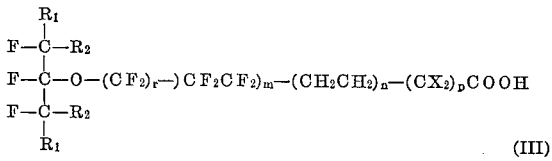

$$(III)$$

wherein $R_1$, $R_2$, X, $m$, $n$, $r$ and $p$ have the afore-stated meanings, and their lower alkyl esters and acid halides.

The polyalkylene polyamine reactants of Formula II above, employed in the preparation of the fluorinated polyamide compounds of the present invention, as a class, are known compounds. These reactants may be straight-chain or branched-chain compounds and may be used in the form of a single compound, as a mixture of isomers or as a mixture of polyamides containing from 3 to 6 nitrogen atoms in the molecule. Specific examples of polyalkylene polyamines employable herein include diethylene triamine, di-n-propylene triamine, di-i-butylene triamine, di-n-hexylene triamine, triethylene tetramine, tri-i-propylene tetramine, tri-n-hexylene tetramine, 4-(2-aminoethyl)-1,4,7-triazaheptane, tetraethylene pentamine, tetra-n-propylene pentamine, tetra-n-butylene pentamine, 4-(2-aminoethyl)-1,4,7,10-tetraazadecane, tetra-n-hexylene pentamine, pentaethylene hexamine, 1-(hydroxyethyl)-4-methyl-1,4,7-triazaheptane, 1,4-dimethyl-8-(6-hydroxyhexyl) - 1,4,8,12 - tetraazadodecane, 1-(6-hydroxyhexyl) - 6,11,16 - trimethyl - 1,6,11,16,21-pentaazaheneicosane, 1,4,7-tris(2 - hydroxyethyl) - 1,4,7,10-tetraazadecane, 4,7-dimethyl-1,4,7,10-tetraazadecane, and 5-methyl-1,5,9-triazanonane. These polyalkylene polyamines can be prepared by standard methods known to those skilled in the art. Preferred polyalkylene polyamines are diethylene triamine, dipropylene triamine, triethylene tetramine and tetraethylene pentamine since these are the more readily commercially available compounds.

Fluorinated carboxylic acids of Formula III above wherein $r$ is 0, $m$ is at least 1 and the sum of $n$ and $p$ is at least 1, can be prepared by various hereinafter described methods from telomers having the general formula

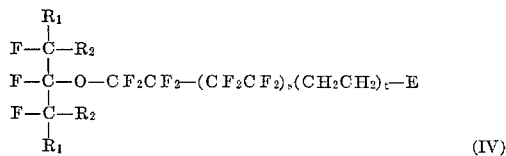

(IV)

wherein $R_1$ and $R_2$ have the afore-stated meanings, wherein $s$ and $t$ are each integers from 0 to 20, the sum of $s$ and $t$ being at least 1, and wherein E is a halogen selected from the group consisting of Br and I. Telomers of that type and their preparation are described in commonly assigned copending application of Anello et al. entitled, "Telomers and Process for the Preparation Thereof," Ser. No. 633,359, filed Apr. 25, 1967, now U.S. Pat. 3,514,487 the pertinent subject mater of which is hereby incorporated by reference. By way of general description, these telomers are prepared by radical addition reactions of polyfluoroisoalkoxyalkyl halide telogens of the formula

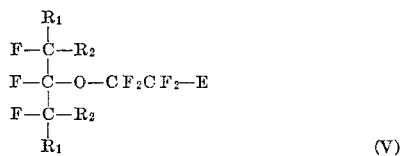

(V)

wherein $R_1$, $R_2$ and E have the afore-stated meanings, with telomerizable unsaturated compounds. The telomerization reaction may be initiated by heat or by means of a free radical initiating catalyst. The polyfluoroisoalkoxyalkyl halide telogen starting materials may be prepared by reacting a corresponding halogenated ketone with an ionizable fluoride salt, e.g. CsF, to form a fluorinated organic salt and then reacting the organic salt with a halogen other than fluoride or chlorine and tetrafluoroethylene. Preparation of the telogen starting materials is described in detail in copending applications of Litt et al., "Fluorinated Ethers," U.S. Ser. Nos. 492,276 and 513,574, filed Oct. 1, 1965, and Dec. 13, 1965 respectively, now U.S. Pats. 3,453,333 and 3,470,256 respectively the pertinent subject matter of which applications is hereby incorporated by reference.

Fluorinated carboxylic acids of Formula III, above, wherein $r$, $n$ and $p$ are all 0 and wherein $m$ is at least 2 may be prepared by reacting the corresponding telomer represented by general Formula IV, above, wherein $t$ is 0 with ICN or $(CN)_2$ to form the nitrile, followed by hydrolysis of the nitrile in known manner to form the free acid. The reaction between the telomer and the ICN or $(CN)_2$ to form the nitrile is carried out under superatmospheric pressure above about 20 to 200 atmospheres or more at temperatures in excess of about 300° C., preferably using an excess of the ICN or $(CN)_2$ reactant. Hydrolysis of the nitrile to form the free acid can be effected by treatment with aqueous, mineral acid, such as hydrochloric, phosphoric, or sulfuric acid, at temperatures between about 60° C. and about 125° C.

Flourinated carboxylic acids of Formula III, above, wherein $m$ is at least 1, $p$ and $r$ are both 0 and $n$ is greater than 0 may be prepared by reacting the corresponding telomer represented by Formula II, above, wherein $t$ is greater than 0 with an alkali metal cyanide to form the nitrile, followed by hydrolysis of the nitrile to form the free acid, as described above. The reaction between the telomer and the alkali metal cyanide is preferably carried out in aqueous alcoholic solution at temperatures between about 60° and about 100° C.

Fluorinated carboxylic acids of Formula III, above, wherein $m$ is at least 1, $r$ is 0, $p$ is 1 and X is hydrogen can be prepared by reacting the corresponding telomer represented by general Formula IV, above, wherein $t$ is at least 1 with $SO_3$ to form the corresponding pyrosulfate, or with oleum to form the corresponding hydrosulfate, hydrolysis of the pyrosulfate or the hydrosulfate with aqueous acid to form the corresponding alcohol, followed by oxidation of the alcohol with dichromate, permanganate or strong nitric acid to form the free acid.

Fluorinated carboxylic acids of Formula III, above, wherein $m$ is at least 1, $r$ and $n$ are both 0, $p$ is 1 and X is fluorine can be prepared by reacting a corresponding telomer represented by Formula IV, above, wherein $t$ is 0 with $SO_3$ to form corresponding acid halides and halopyrosulfates and hydrolyzing the acid halides and halopyrosulfates by refluxing with water to obtain the corresponding free acids. Fluorinated carboxylic acids of Formula III, above, wherein $r$ is 1 and $m$, $n$ and $p$ are all 0 can be prepared by the same method from polyfluoroisoalkoxyalkyl halide compounds of Formula V, above.

Fluorinated carboxylic acids of Formula III, above, wherein $m$ is 1 and $r$, $n$ and $p$ are all 0 can be prepared from polyfluoroisoalkoxyalkyl halide compounds of Formula V, above, by reacting them with a Grignard reagent to form a magnesium halide adduct, reacting this adduct with $CO_2$ to form a magnesium halide salt, and then acidifying the salt to obtain the desired acid. The reactions involving the Grignard reagent and the carbon dioxide proceed very rapidly and can be conducted at temperatures considerably below 0° C. Preparation of these acids is described in detail in commonly assigned co-pending application of Litt et al., "Fluorinated Ethers," U.S. Ser. No. 492,276, filed Oct. 1, 1965 now U.S. Pat. 3,453,333, referred to above.

The esters and acid halides of the above-described acids may be prepared from the acids by conventional procedures.

While the telomers of Formula IV, above, and the fluorinated carboxylic acid reactants derived therefrom, may be prepared as discrete compounds, they are generally obtained as mixtures of compounds of varying chain length. It is to be understood that both, the individual discrete fluorinated carboxylic acid reactants as well as their mixtures of compounds of varying chain length are suitable for the preparation of the novel fluorinated amide compounds of the present invention. It is therefore intended that the appended claims cover fluorinated amide compositions derived from individual, discrete fluorinated carboxylic acid reactants as well as amide compositions derived from mixtures of carboxylic acid reactants of varying chain length.

Preparation of above-described acids is described in more detail in commonly assigned copending applications of Anello et al., U.S. Ser. Nos. 721,115 and 721,117, both filed April 1968, respectively entitled "Fluorocarbon Acids and Derivatives" and "Fluorocarbon Compounds," the pertinent subject matter of which applications is hereby incorporated by reference.

The fluorinated amide compounds of the present invention may be prepared by simply mixing the fluorinated carboxylic acid reactant with the polyalkylene polyamine starting material. These reactants may be charged in a molar proportion of 1 mol of polyalkylene polyamine to about 1 to 7, preferably 1.5 to 2.5 mols of fluorinated carboxylic acid reactant. Use of the reactants in about stoichiometric proportions is especially desirable.

The reaction temperature, in general, is dependent upon the particular fluorinated carboxylic acid reactant and polyalkylene polyamine reactant involved. The temperature may range from about 0° C. to 200° C. although temperatures above about 100° C. are normally used when the fluorinated carboxylic acid reactant comprises a fluorinated carboxylic acid and temperatures below about 100° C. are preferred when an ester or acid halide serves as the fluorinated carboxylic acid reactant. If desired, the reaction may be conducted in the presence of an inert organic solvent, and, when present, the maximum temperature employable is limited only by the reflux temperature of the reaction mixture. Although reaction may be effected at superatmospheric pressure, the reaction is preferably conducted at atmospheric pressure.

The inert organic solvent employable herein is generally one lower boiling than the fluorinated amide product and may be lower boiling or higher boiling than the by-product materials formed during the reaction. Any organic liquid which is capable of solubilizing the polyalkylene polyamine reactant and inert to the reactants and products of the reaction may be employed. Suitable inert organic solvents include ethers such as dioxane, diethyl ethers, diisopropyl ether, di-n-propyl ether and tetrahydrofuran; hydrocarbons such as heptane, benzene, toluene and xylene; dimethylformamide; tetramethylene sulfone or any other customarily employed organic solvent.

When the fluorinated carboxylic acid reactant is present in the form of a lower alkyl ester of one of the above-described fluorinated carboxylic acids, as preferred, an alcohol is obtained as by-product of the reaction. The alcohol may readily be removed by conducting the reaction the reaction at about the reflux temperature of the mixture, and the desired fluorinated polyamide product recovered as the distilland.

When one of the above-described fluorinated carboxylic acids per se serves as the fluorinated carboxylic acid reactant, water is formed as by-product of the reaction and may be readily removed by conducting the reaction at temperatures above the boiling point of the by-product water. If desired, the preparation of the fluorinated amide product may be facilitated by employment of azetropic materials which aid in the removal of water should the reaction be effected at temperatures below the boiling point of the by-product water. Readily available organic substances capable of forming an azeotrope with water include xylene, toluene, benzene and tetralin.

When the acid halide is employed as the fluorinated carboxylic acid reactant, it is generally desirable to use a molar excess of polyalkylene polyamine compound, or if desired, to have present in the reaction mixture at least equimolar proportions of a halogen acid acceptor, typically, a trialkylamine such as trimethylamine and triethylamine; an alkali metal hydroxide such as sodium hydroxide; an alkali metal carbonate such as sodium carbonate; pyridine, etc. which reacts with a hologen acid evolved during the reaction to form a by-product salt. After completion of the reaction, the insoluble by-product salt, e.g., diethylene triamine hydrochloride, sodium chloride or pyridine hydrochloride may be solubilized by addition of water or dilute base, and its removal effected by separation of the resulting aqueous layer.

The reaction product, obtained as a result of the reaction of the fluorinated carboxylic acid reactant and the polyalkylene polyamine reactant above described, may comprise a single compound conforming to the above stated structural Formula I a mixture of isomers thereof or a reaction mass compoed of amide products containing two or more amide functions depending upon the polyalkylene polyamine reactant employed, the reactivity of the fluorinated carboxylic acid reactant present, the solubility of the amide product obtained during the reaction in the reaction mixture and the molar proportions of fluorinated carboxylic acid reactant employed. The resulting fluorinated amide product whether it comprises a single compound, a mixture of isomers thereof or a mass composed of amide products containing two or more amide functions, is suitable without further purification for direct application as an oil-repellency agent. However, if desired, the fluorinated amide product may be further purified as by distillation or recrysatllization from any commonly employed inert organic solvent such as acetonitrile, chloroform, ethanol and propanol.

DESCRIPTION OF THE PREFERRED EMBODIMENTS

In the

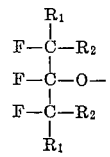

moiety of the $R_f$ radical of the fluorinated polyamide compounds of Formula I, $R_1$ and $R_2$ are preferably fluorine or perfluoroalkyl groups. When perfluoroalkyl groups, $R_1$ and $R_2$ preferably contain 1–2 carbon atoms. When the $R_1$ and $R_2$ groups contain hydrogen substitution, the atomic ratio of fluorine to hydrogen is at least 1:1.

In preferred embodiments integer $m$ in the $R_f$ radical of the fluorinated amide compounds of Formula I, above, is at least 1, and the sum of $m$ and $n$ is preferably from 1 to 10. Specific examples of preferred embodiments of the preferred

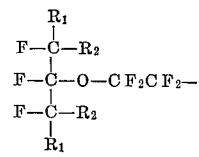

moiety of the $R_f$ radical of the compounds of the present invention include the following:

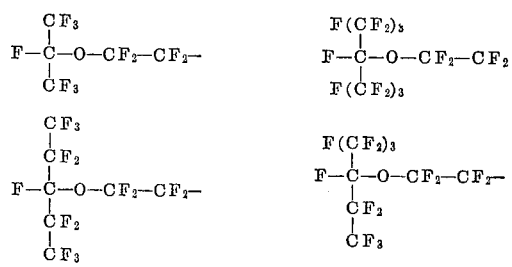

$$\text{(CF}_2\text{)}_2\underset{\text{CF}_2}{\overset{\text{CF}_2}{\text{FC}}}-\text{O}-\text{CF}_2-\text{CF}_2-\qquad \text{(CF}_2\text{)}_3\underset{\text{CF}_2}{\overset{\text{CF}_2}{\text{FC}}}-\text{O}-\text{CF}_2-\text{CF}_2-$$

$$\underset{\underset{\text{F(CF}_2\text{)}_3}{|}}{\overset{\overset{\text{F(CF}_2\text{)}_3}{|}}{\text{F}-\text{C}}}-\text{O}-\text{CF}_2-\text{CF}_2-\qquad \underset{\text{CF}_2}{\overset{\text{CF}_2}{\text{CF}_2}}\underset{\text{CF}_2}{\overset{\text{CF}_2}{\text{FC}}}-\text{O}-\text{CF}_2\text{CF}_2-$$

$$\underset{\underset{\text{(CF}_2\text{)}_9}{|}}{\overset{\overset{\text{(CF}_2\text{)}_9}{|}}{\text{F}-\text{C}}}-\text{O}-\text{CF}_2-\text{CF}_2-\qquad \underset{\underset{\text{CF}_3}{|}}{\overset{\overset{\text{CF}_3}{|}}{\text{F}-\text{C}-\text{CF}_3}}$$

$$\underset{\text{CF}_3}{}\qquad \underset{\underset{\text{CF}_3}{|}}{\text{F}-\text{C}-\text{O}-\text{CF}_2-\text{CF}_2-}$$

Compounds corresponding to the formula $$R_f-\overset{O}{\overset{\|}{C}}-\overset{H}{\overset{|}{N}}-\left(C_xH_{2x}\overset{Z'}{\overset{|}{N}}\right)_y-C_xH_{2x}-\overset{H}{\overset{|}{N}}-\overset{O}{\overset{\|}{C}}-R_f \qquad (V)$$

wherein $R_f$ has the meaning given above, wherein $x$ and $y$ are integers from 2 to 4 and 1 to 4, respectively, and wherein $Z'$ is hydrogen or $R_fCO-$, wherein $R_f$ has the meaning given above, constitute preferred embodiments of the present invention.

Most preferred embodiments of the present invention are compounds according to Formula V, above, wherein the $R_f$ radical has the formula $$(CF_3)_2CFO-(CF_2CF_2)_m-(CH_2CH_2)_n-(CX_2)_p-$$

wherein $m$ is an integer from 1 to 10, $n$ is an integer from 0 to 10, with the proviso that the sum of $m$ and $n$ is from 1 to 10, and wherein X and $p$ have the afore-stated meanings.

The following examples relate to the preparation of representative compounds of the present invention but are not intended to be limiting on the scope thereof.

EXAMPLE 1

Under constant agitation and external cooling to maintain the reaction mixture between about 25°–30° C., 4.17 g. (0.0405 mol) of diethylene triamine are slowly added to 40 g. (0.0809 mol) of $(CF_3)_2CFO-(CF_2)_5COOCH_3$. After about ⅔ of the diethylene triamine is added the reaction mixture solidifies. Upon completion of the amine addition the reaction mixture is warmed to 75° C. (the mixture becomes liquid between about 35°–55° C.) and is maintained at that temperature for a period of 16 hours. After that 16 hour period the reaction mixture is allowed to cool to room temperature (about 25° C.), whereupon it solidifies. Repeated recrystallization of the mixture thus obtained from a 6:1 chloroform-ethanol mixture yields two solid product fractions: fraction (a), consisting of finely divided, soft white crystals, and fraction (b), a waxy yellow solid.

Fraction (a) is separated and further recrystallized from a chloroform-ethanol mixture to yield 6.5 g. of white crystalline product, which, after drying in vacuo, has a M.P. of 34°–35° C. This product is the compound $$[(CF_3)_2CFO-(CF_2)_5-CONHCH_2CH_2]_2NH$$

Elemental analysis of that product compares with calculated compositions for $C_{22}H_{11}N_3O_4F_{34}$ as follows:

Calculated (percent): C, 25.91; H, 1.07; N, 4.09; F, 62.87. Analysis (percent): C, 26.15; H, 1.31; N, 4.08; F, 61.05.

Fraction (b) is further recrystallized from a chloroform-ethanol mixture, and then from ethanol alone to give a solid. This solid is extracted with chloroform, leaving 2 g. of a white solid, M.P. ca. 115° C., which, upon further recrystallization from acetonitrile has a M.P. 116°–117.8° C. This product is the compound $$[(CF_3)_2CFO(CF_2)_5CONHCH_2CH_2]_2$$
$$NCO(CF_2)_5CFO(CF_3)_2$$

Elemental analysis of that product compares with calculated values of $C_{31}H_{10}N_3O_6F_{51}$ as follows:

Calculated (percent): C, 25.0; H, 0.68; N, 2.82; F, 65.10. Analysis (percent): C, 25.14; H, 0.96; N, 3.10; F, 66.86.

The assigned structure is confirmed by infrared analysis.

EXAMPLE 2

A solution of 49 g. (0.048 mol) of diethylene triamine in 60 ml. of diethyl ether is placed in a reaction vessel equipped with dropping funnel, condenser, magnetic stirrer and calcium chloride drying tube. After chilling the vessel in an ice bath for a period of about 20 minutes, 39.9 g. (0.08 mol) of $(CF_3)_2CFO-(CF_2)_5COCl$ is added with stirring to the contents of the vessel during a 30 minute period. The ice bath is then removed and stirring is continued at room temperature for another 20 minutes. Thereafter, 10 ml. of an 8% aqueous sodium hydroxide solution is added to the reaction mixture and stirring is continued under cooling for an additional 15 minutes. A precipitate results which is recovered by filtration under reduced pressure and is washed with water. The precipitate is air dried to obtain the crude product $$[(CF_3)_2CFO-(CF_2)_5CONHCH_2CH_2]_2NH$$

which can be purified by recrystallization from a chloroform/ethanol mixture.

EXAMPLE 3

To a solution of 24.7 g. (0.05 mol) of $$(CF_3)_2CFO-(CF_2)_5COOCH_3$$

in 25 ml. of diethyl ether there is added 3.07 g. (0.0235 mol) of di-n-propylene triamine. The resulting solution is heated under reflux for a period of 24 hours. After removal of the solvent under reduced pressure there is obtained the crude product $$[(CF_3)_2CFO-(CF_2)_5CONHCH_2CH_2CH_2]_2NH$$

which can be purified by recrystallization from acetonitrile.

EXAMPLE 4

A solution of 7.49 g. (0.04 mol) of diethylene triamine in 50 ml. of ethyl ether is heated to reflux and 50 g. (0.08 mol) of $(CF_3)_2CFO-(CF_2)_7CO_2C_3H_7$ is added dropwise to the refluxing reaction mixture. The ethyl ether is then removed by distillation and the mixture is heated for one hour at 75° C. Infrared analysis of the reaction mixture shows that all of the starting ester has been converted to the amide. The product mixture is then placed in a rotary evaporator and is heated to about 80° C. to remove any remaining volatiles. The residue, which is a viscous oil, is triturated with 200 ml. of water to give a soft, waxy solid which is air dried and then recrystallized from about 300 ml. of chloroform to provide 30 g. of the compound having the formula $$[(CF_3)_2CFO-(CF_2)_7CONHCH_2CH_2]_2NH$$

having a melting point of 42°–45° C. Evaporation to dryness of the mother liquor from the recrystallization step yields an additional 11.0 g. of crude product.

EXAMPLES 5–29

Additional illustrative fluorinated polyamide reaction products having oil-repellency properties are listed in Table I below. These compositions are prepared by reaction of the fluorinated carboxylic acid and polyalkylene polyamine reactants indicated in manner analogous to that described in the above examples.

TABLE I

| Ex. | Fluorinated carboxylic acid reactant | Polyalkylene polyamine reactant | Product |
|---|---|---|---|
| 5 | (CF$_3$)$_2$CFO—CF$_2$CF$_2$—CH$_2$CH$_2$—COOCH$_3$ | NH$_2$(C$_2$H$_4$NH)$_2$H | [(CF$_3$)$_2$CFO—CF$_2$CF$_2$—CH$_2$CH$_2$—CONHCH$_2$CH$_2$]$_2$ |
| 6 | (CF$_3$)$_2$CFO—(CF$_2$)$_4$—(CH$_2$)$_5$COCl | NH$_2$(C$_2$H$_4$NH)$_2$H | (CF$_3$)$_2$CFO—(CF$_2$)$_4$—(CH$_2$)$_5$—C(=O)—NH(C$_2$H$_4$NH)$_2$—C(=O)—(CH$_2$)$_5$—(CF$_2$)$_4$—OCF(CF$_3$)$_2$ |
| 7 | (CF$_3$)$_2$CFO—CF$_2$CF$_2$CH$_2$COCl | NH$_2$(C$_2$H$_4$NH)$_2$H | (CF$_3$)$_2$CFO—CF$_2$CF$_2$CH$_2$—C(=O)—NHC$_2$H$_4$N=C(—C$_2$H$_4$NH—CH$_2$CF$_2$CF$_2$—OCF(CF$_3$)$_2$)$_2$ |
| 8 | (CF$_3$)$_2$CFO—(CF$_2$)$_8$(CH$_2$)$_3$COOH | NH$_2$(C$_2$H$_4$NH)$_2$H | [(CF$_3$)$_2$CFO—(CF$_2$)$_8$(CH$_2$)$_3$—C(=O)—NHC$_2$H$_4$]$_2$NH |
| 9 | [cyclic] (CF$_2$)$_2$F, CF$_2$, CF$_2$, CFO—(CF$_2$)$_2$(CH$_2$)$_2$COOCH$_3$ | NH$_2$(C$_2$H$_4$NH)$_2$H | [cyclic] (CF$_2$)$_2$F, CF$_2$, CF$_2$, CFO—(CF$_2$)$_2$(CH$_2$)$_2$—C(=O)—NHC$_2$H$_4$]$_2$NH |
| 10 | FC[—O—(CF$_2$)$_2$(CH$_2$)$_3$COCl](—(CF$_2$)$_2$F)$_2$ | NH$_2$(C$_2$H$_4$NH)$_3$H | FC[—O—(CF$_2$)$_2$(CH$_2$)$_3$—C(=O)—NH(C$_2$H$_4$NH)$_3$—C(=O)—(CH$_2$)$_3$—(CF$_2$)$_2$—O—](—(CF$_2$)$_2$F)$_2$ |
| 11 | (CF$_3$)$_2$CFO—(CF$_2$)$_4$(CH$_2$)$_2$COCl | NH$_2$(C$_2$H$_4$NH)$_3$H | (CF$_3$)$_2$CFO—(CF$_2$)$_4$(CH$_2$)$_2$—C(=O)—NH—(C$_2$H$_4$N)$_2$—C$_2$H$_4$NH—C(=O)—(CH$_2$)$_2$(CF$_2$)$_4$—OCF(CF$_3$)$_2$ |
| 12 | FC[—O—(CF$_2$)$_{20}$(CH$_2$)$_{11}$COBr](—(CF$_2$)$_3$F)(—CF$_3$) | NH$_2$(C$_2$H$_4$NH)$_2$H | FC[—O—(CF$_2$)$_{20}$(CH$_2$)$_{11}$—C(=O)—NH(C$_2$H$_4$NH)$_2$—C(=O)—(CH$_2$)$_{11}$(CF$_2$)$_{20}$—O—](—(CF$_2$)$_3$)(—CF$_3$) |
| 13 | (CF$_3$)$_2$CFO—(CF$_2$)$_5$—COOC$_2$H$_5$ | NH$_2$(C$_2$H$_4$NH)$_2$H | (CF$_3$)$_2$CFO—(CF$_2$)$_5$—C(=O)—NHC$_2$H$_4$N=C(—(C$_2$H$_4$NH)$_2$—C(=O)—(CF$_2$)$_5$—OCF(CF$_3$)$_2$) |
| 14 | (CF$_3$)(C$_2$F$_5$)CFO—(CF$_2$)$_2$(CH$_2$)$_3$COF | NH$_2$(C$_2$H$_4$NH)$_2$H | (CF$_3$)(C$_2$F$_5$)CFO—(CF$_2$)$_2$(CH$_2$)$_3$—C(=O)—NH(C$_2$H$_4$NH)$_4$—C(=O)—(CH$_2$)$_3$(CF$_2$)$_2$—OCF(CF$_3$)$_2$ |
| 15 | (CF$_3$)$_2$CFO—(CF$_2$)$_2$(CH$_2$)$_2$COOCH$_3$ | NH$_2$(C$_4$H$_8$NH)$_4$H | (CF$_3$)$_2$CFO—(CF$_2$)$_2$(CH$_2$)$_2$—C(=O)—NH(C$_4$H$_8$NH)$_4$—C(=O)—(CH$_2$)$_2$(CF$_2$)$_2$—OCF(CF$_3$)$_2$ |
| 16 | (CF$_3$)$_2$CFO—(CF$_2$)$_{20}$COCl | NH$_2$(C$_4$H$_8$NH)$_2$H | (CF$_3$)$_2$CFO—(CF$_2$)$_{20}$—C(=O)—NH(C$_4$H$_8$NH)$_2$—C(=O)—(CF$_2$)$_{20}$—OCF(CF$_3$)$_2$ |
| 17 | (CF$_3$)$_2$CFO—(CF$_2$)$_4$—CH$_2$—COOC$_2$H$_5$ | NH$_2$(C$_4$H$_8$NH)$_4$H | (CF$_3$)$_2$CFO—(CF$_2$)$_4$—CH$_2$—C(=O)—NH(C$_4$H$_8$NH)$_4$—C(=O)—CH$_2$—(CF$_2$)$_4$—OCF(CF$_3$)$_2$ |
| 18 | (CF$_3$)$_2$CFO—(CF$_2$)$_2$(CH$_2$)$_3$COOH | NH$_2$(C$_6$H$_{12}$NH)H | (CF$_3$)$_2$CFO—(CF$_2$)$_2$(CH$_2$)$_3$—C(=O)—NH(C$_6$H$_{12}$NH)$_3$—C(=O)—(CH$_2$)$_3$(CF$_2$)$_2$—OCF(CF$_3$)$_2$ |

TABLE I.—Continued

| Ex. | Fluorinated carboxylic acid reactant | Polyalkylene polyamine reactant | Product |
|---|---|---|---|
| 19 | $(CF_3)_2CFO-(CF_2)_2(CH_2)_2COCl$ | $NH_2(CHCH_2NH)_2H$<br>$\|$<br>$CH_3$ | $(CF_3)_2CFO-(CF_2)_2(CH_2)_2-\overset{O}{\overset{\|}{C}}-NH(\overset{CH_3}{\overset{\|}{C}HCH_2NH})_2-\overset{O}{\overset{\|}{C}}-(CH_2)_2(CF_2)_2-OCF(CF_3)_2$ |
| 20 | $(CF_3)_2CFO-(CF_2)_4(CH_2)_2COF$ | $NH_2(CHCH_2NH)_2H$<br>$\|$<br>$CH_3$ | $(CF_3)_2CFO-(CF_2)_4(CH_2)_2-\overset{O}{\overset{\|}{C}}-NH(\overset{CH_3}{\overset{\|}{C}HCH_2NH})_3-\overset{O}{\overset{\|}{C}}-(CH_2)_2(CF_2)_4-OCF(CF_3)_2$ |
| 21 | $(CF_3)_2CFO-(CF_2)_2COOC_2H_5$ | $NH_2CH_2CH_2NCH_2CH_2NH_2$<br>$\|$<br>$CH_2CH_2NH_2$ | $(CF_3)_2CFO-(CF_2)_2-\overset{O}{\overset{\|}{C}}-NHCH_2CH_2NCH_2CH_2NH-\overset{O}{\overset{\|}{C}}-(CF_2)_2-OCF(CF_3)_2$<br>$\|$<br>$CH_2CH_2NH_2$ |
| 22 | $(CF_3)_2CFO-(CF_2)_3COOC_2H_5$ | $NH_2CH_2CH_2NCH_2CH_2NH_2$<br>$\|$<br>$CH_2CH_2NH_2$ | $(CF_3)_2CFO-(CF_2)_3-\overset{O}{\overset{\|}{C}}-NHCH_2CH_2NCH_2CH_2NH-\overset{O}{\overset{\|}{C}}-(CF_2)_3-OCF(CF_3)_2$<br>$\|$<br>$CH_2CH_2NH-\overset{O}{\overset{\|}{C}}-(CF_2)_3-OCF(CF_3)_2$ |
| 23 | $(CF_3)_2CFO-CF_2CF_2-CH_2CH_2-COCl$ | $NH_2(C_2H_4NH)_2H$ | $[(CF_3)_2CFO-CF_2CF_2-CH_2CH_2-CONH(C_2H_4NH)_2CONH-CH_2CH_2-CF_2CF_2-OCF(CF_3)_2]$ |
| 24 | $(CF_3)_2CFO-CF_2CF_2-CH_2CH_2-COCl$ | $NH_2(C_2H_4NH)_3H$ | $(CF_3)_2CFO-CF_2CF_2CH_2CH_2-CONH(C_2H_4NH)_3CO-CH_2CH_2CF_2-OCF(CF_3)_2$ |
| 25 | $(CF_3)_2CFO-(CF_2)_3COCl$ | $NH_2C_2H_4N(C_4H_9)C_2H_4NH_2$ | $(CF_3)_2CFO-(CF_2)_3CONH(C_2H_4N(C_4H_9)C_2H_4NH_2$ |
| 26 | $(CF_3)_2CFO-(CF_2)_3COOH$ | $NH_2(C_2H_4NH)_2H$ | $(CF_3)_2CFO-(CF_2)_3CONH(C_2H_4NH_2)_2H$ |
| 27 | $(CF_3)_2CFO-CF_2-COF$ | $NH_2C_2H_4N(C_4H_9OH)C_3H_6N(C_2H_5)H$ | $(CF_3)_2CFO-CF_2-CONHC_2H_4N(C_4H_9OH)C_3H_6N(C_2H_5)CO-CF_2-OCF(CF_3)_2$<br>$\|$<br>$C_2H_5$    $C_2H_5OH$ |
| 28 | $(CF_3)_2CFO-CF_2CF_2CH_2COOH$ | $NH_2C_2H_4N(C_2H_5)C_2H_4NH-C_2H_4N(C_2H_4OH)H$ | $(CF_3)_2CFO-CF_2CF_2CH_2-CONHC_2H_4N-C_2H_4NH-C_2H_4N-CO-CH_2CF_2CF_2-OCF(CF_3)_2$<br>                                                      $C_2H_5$         $C_2H_4OH$ |
| 29 | $(CF_3)_2CFO-(CF_2)_2COF$ | $NH_2C_2H_4N(C_2H_4OH)C_2H_4N(C_6H_{12}OH)H$ | $(CF_3)_2CFO-(CF_2)_2-CO-NHC_2H_4NC_2H_4NCO-(CF_2)_2-OCF(CF_3)_2$<br>                                                $C_2H_4OH$      $C_6H_{12}OH$ |

As stated above, the fluorinated polyamide compounds of the present invention are valuable as oil-repellency agents. These compounds may be applied to the article to be rendered oil repellent by treating the same with a solution of the repellent and evaporating the solvent. If desired, the treated article may then be cured at an elevated temperature. The concentration of fluorinated polyamide oil-repellent on the treated article generally may vary from about 0.5% to 10%, preferably 1.0% to 4.0 based on the weight of the article. Since the solvent used in formulating the oil-repellent composition functions essentially as a carrier for the oil-repellent agent, any organic liquid inert to the article to be treated and capable of dissolution of the requisite amount of oil-repellency agent may be employed. Acetone, methyl ethyl ketone, acetonitrile and dimethyl formamide are illustrative solvents which may be used in preparing the oil-repellent compositions. Alternatively, aqueous emulsions of the oil repellent may be applied onto the articles to be treated by conventional aqueous application methods. The solvent may be evaporated by air drying at room temperature. If it is desired to cure the treated article, the solvent may be evaporated prior to curing or during curing of the oil repellent chemical onto the article. Preferably, the article treated with a solution of the oil repellent chemical is air dried prior to curing for a time sufficient to evaporate essentially all of the solvent. Thereafter, the article having on its surface the oil repellent chemical is cured or "heat-set" at a temperature of about 100° C. to 160° C., for a time period varying inversely with the temperature, ranging from about 1 second to 5 minutes.

The oil repellent compounds of the invention are especially useful in treating paper and in treating textiles (fabrics and fibers) comprised of natural and/or synthetic fibers including cotton, nylon, wool, polyethylene terephthalate and polyacrylonitrile. If desired, auxiliary agents such as those imparting water repellency and other properties may be applied in conjunction with the oil repellent chemicals of the invention. In addition, other materials such as the surfaces of wood, plastics, glass and metals may be treated with solutions containing the fluorinated polyamide compositions of the invention to render the same oil repellent.

Tests relating to the evaluation of a typical fluorinated polyamide composition of the present invention as oil-repellency agent on textiles and paper were conducted. In the test on textiles, pieces of 80 x 80 white cotton print cloth were dipped for about 5 minutes into 4% by weight acetone solutions of the compounds $[(CF_3)_2CFO-(CF_2)_5CONHCH_2CH_2]_2NH$ and $[(CF_3)_2CFO-(CF_2)_5-CONHCH_2CH_2]_2$<br>                                                       $N-CO-(CF_2)_5-OCF(CF_3)_2$ The treated cloths were air dried overnight.

The procedure employed in determining the oil-repellency ratings is described, for example, on pages 323–4 of the April 1962 edition of the Textile Research Journal. This procedure involves gently placing on the treated fabric drops of mixtures of mineral oil ("Nujol") and n-heptane in varying proportions. The drops are allowed to stand or the treated fabric undisturbed for 3 minutes.

After the 3 minute time period, the wetting and penetration of the fabric is visually observed. The number corresponding to the mixture containing the highest percentage of n-heptane which does not penetrate or wet the fabric is considered to be the oil-repellency rating of the treated fabric.

The cotton specimens treated and tested as described above had an oil-repellency rating of 110–120 and 130 respectively. Oil-repellency ratings of 100 or above indicate excellent oil-repellency.

In the test on paper, handsheets of unsized 50/50 hardwood/softwood pulp beaten to 400 ml. Canadian Standard freeness were impregnated with the compound $$[(CF_3)_2CFO\text{—}(CF_2)_5\text{—}CONHCH_2CH_2]_2NH$$

by total immersion for a period of 60 seconds in acetone solutions of the compound of varying concentrations. After the 60 second period, the handsheets were removed from the repellent solution, excess repellent solution was removed by blotting with blotting paper, and the sheets were dried at 110° C. for a period of 10 minutes. Oil-repellency ratings of the sheets so treated were determined immediately after cooling to room temperature and again after conditioning of the sheets at 50% R.H. at 72° F. for a period of 72 hours.

The procedure employed in determining the oil-repellency ratings on paper is described, for example, in a Technical Bulletin issued by the Minnesota Mining and Manufacturing Company entitled, "Paper Chemical FC–805–IV. Properties of Treated Paper—C. Oil Resistance—2. Comparative Kit Test." This procedure involves gently placing on treated paper drops of mixtures of castor oil, toluene and heptane in varying proportions. The drops are allowed to stand on the treated paper undisturbed for 15 seconds. After the 15 second period, the wetting and penetration of the paper is visually observed. Failure is detected by pronounced darkening caused by penetration. The darkening of even a small portion of the area under the drop is considered failure. The number corresponding to the mixture containing the highest percentage of heptane which does not penetrate or wet the paper is the "Kit Number" of the paper and is considered to be the oil-repellency rating of the treated paper. The higher the "Kit Number" the better is the oil-repellency of the paper. Table II below shows the compositions of the oil mixtures and corresponding "Kit Numbers."

TABLE II

| Kit No. | Volume castor oil | Volume toluene | Volume heptane |
|---|---|---|---|
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

The results of the oil-repellency tests on paper are summarized in Table III below:

TABLE III

| Concentration of repellent in acetone solution (wt. percent) | "Kit number" Off drier | After conditioning |
|---|---|---|
| 1.0 | 12+ | 12+ |
| 0.5 | 12+ | 12+ |
| 0.25 | 12 | 12+ |
| 0.13 | 6–7 | 11 |

The data in the table clearly show that these paper specimens had excellent oil-repellency.

In the treatment of paper to render the same oil- and water-repellent, the fluorinated quarternary ammonium salts of the present invention may be applied thereto either externally as by treating the paper with a solution of the repellent and evaporating the solvent in the manner described above, or the repellent may be applied thereto internally, as by adding the repellent to the furnish from which the paper is to be formed, and then forming the paper in the usual manner. When paper is to be rendered oil- and water-repellent by internal treatment the fluorinated polyamide repellents of the present invention are suitably added to the furnish in amount of between about 0.25% and about 1.5%, dry weight basis, preferably between about 0.5% and about 0.75%, dry weight basis. The repellent may be added to the furnish neat or in form of its solution in one of the above-described solvents.

If desired, the repellent may be added to the furnish together with any of the usual additives, such as fillers, e.g. kaolin, China clay, calcium carbonate, titanium dioxide; sizes, e.g. rosin, hydrocarbon and natural waxes, natural gums, starches, casein, asphalt emulsions, synthetic resins, cellulose derivatives; coloring matter, e.g. dyes and pigments; and alum.

Preparation of the paper from the furnish to which the repellent has been added, as described above, follows conventional paper making procedure.

When textiles and paper materials are treated with other fluorinated polyamides of the present invention in the manner described above, similar results are obtained, that is to say, good oil-repellency is imparted to the materials so treated.

From the foregoing it is apparent that we have discovered a series of novel and valuable compounds possessing outstanding value as oil-repellency agents.

Since various changes and modifications may be made in the invention without departing from the spirit or essential characteristics thereof, it is intended that all matter contained in the above description shall be interpreted as illustrative and not restrictive, the invention being solely limited by the scope of the appended claims.

We claim:

1. Compounds having the structural formula $$\underset{\substack{\|\\O}}{R_f\text{—}C}\text{—}\underset{\substack{|\\H}}{N}\text{—}(C_xH_{2x}N)_y\text{—}C_xH_{2x}\text{—}\underset{\substack{|\\H}}{N}\text{—}Z$$

wherein
 (a) $R_f$ is a radical having the formula $$\begin{array}{c}R_1\\|\\F\text{—}C\text{—}R_2\\|\\F\text{—}C\text{—}O\text{—}(CF_2)_r\text{—}(CF_2CF_2)_m\text{—}(CH_2CH_2)_n\text{—}(CX_2)_p\text{—}\\|\\F\text{—}C\text{—}R_2\\|\\R_1\end{array}$$

wherein
 (i) $R_1$ and $R_2$ are fluorine or are fluoroalkyl groups, or, when taken together, are fluoroalkylene groups forming a homocyclic aliphatic structure, which $R_1$ and $R_2$ groups may each have from 1 to 9 carbon atoms, provided that not more than three of the $R_1$ and $R_2$ groups may be fluoroalkyl groups,
 (ii) $m$ and $n$ are each integers of from 0 to 20, with the proviso that the sum of $m$ and $n$ is from 0 to 20, and provided further that when $r$ is 0, $m$ is at least 1,
 (iii) X is selected from the group consisting of hydrogen and fluorine, with the proviso that when $n$ is greater than 0, then X is always hydrogen,
 (iv) $p$ is 0 or 1,
 (v) $r$ is 0 or 1, with the proviso that when the sum of $m$, $n$ and $p$ is greater than 0, then $r$ is always 0,
 (b) $x$ is an integer of from 2 to 6, (c) y is an integer of from 1 to 4,
(d) Z is a member selected from the group consisting of
  (i) hydrogen,
  (ii) alkyl having from 1 to 6 carbon atoms,
  (iii) a radical having the formula —ROH wherein R is a divalent alkylene bridging group containing from 1 to 6 carbon atoms, and
  (iv) an acyl radical having the formula

wherein $R_f$ has the afore-stated meaning, and
(e) Z', which may be the same or different in different

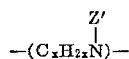

groups, is a member selected from the group consisting of
  (i) hydrogen,
  (ii) alkyl having from 1 to 6 carbon atoms,
  (iii) a radical having the formula —ROH wherein R has the aforestated meaning,
  (iv) an acyl radical having the formula

wherein $R_f$ has the afore-stated meaning, and
(v) a radical having the formula

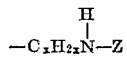

wherein x and Z have the afore-stated meanings.

2. Compounds according to claim 1 having the structural formula

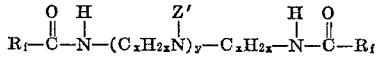

wherein $R_f$ and y have the meanings given in claim 1, wherein x is an integer of from 2 to 4, and wherein Z' is selected from the group consisting of hydrogen and $COR_f$, wherein $R_f$ has the afore-stated meaning.

3. Compounds according to claim 2 wherein the $R_1$ and $R_2$ groups in the $R_f$ radical are selected from the group consisting of fluorine and perfluoroalkyl groups having from 1 to 2 carbon atoms.

4. Compounds according to claim 3 wherein the $R_f$ radical has the formula

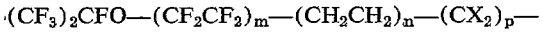

wherein p is 0 or 1, m is an integer from 1 to 10, n is an integer from 0 to 10 with the proviso that the sum of m and n is from 1 to 10, and wherein X is selected from the group consisting of hydrogen and fluorine, provided that when n is greater than 0, then X is always hydrogen.

5. A compound according to claim 4 having the structural formula $[(CF_3)_2CFO—(CF_2)_5—CONHCH_2CH_2]_2NH$ 6. A compound according to claim 4 having the structural formula

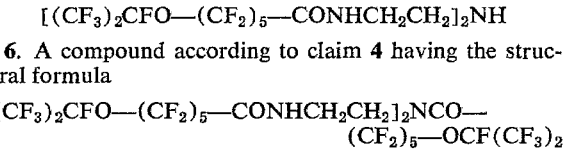

7. A compound according to claim 4 having the structural formula

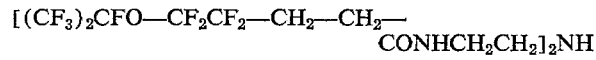

8. A compound according to claim 4 having the structural formula

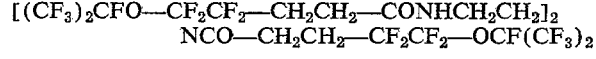

9. A compound according to claim 4 having the structural formula

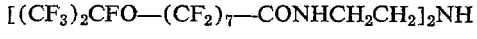

References Cited
UNITED STATES PATENTS

| | | | |
|---|---|---|---|
| 2,528,274 | 10/1950 | Gonderson | 260—404.5 |
| 2,593,737 | 4/1952 | Diesslin et al. | 260—514 |
| 3,038,820 | 6/1962 | Albrecht | 260—404.5 |
| 3,420,697 | 1/1969 | Sweeney et al. | 260—404.5 |
| 3,446,570 | 5/1969 | Sweeney et al. | 260—404.5 |
| 3,453,333 | 7/1969 | Litt et al. | 260—633 |
| 3,470,256 | 9/1969 | Evans et al. | 260—611 |

LEWIS GOTTS, Primary Examiner

G. HOLLRAB, Assistant Examiner

U.S. Cl. X.R.

260—557, 561; 8—115.5, 116.2, 119, 128; 106—2; 117—126, 127, 134, 135.5, 138.8, 139.5, 148, 155

PO-1050
(5/69)

UNITED STATES PATENT OFFICE
CERTIFICATE OF CORRECTION

Patent No. 3,576,019  Dated April 20, 1971

Inventor(s) Richard F. Sweeney and Alson K. Price

It is certified that error appears in the above-identified patent and that said Letters Patent are hereby corrected as shown below:

Column 2, line 60, in the formula, that part of the formula reading "$(CF_2)_r-)CF_2CF_2)_m-$" should be --$(CF_2)_r-(CF_2CF_2)_m-$--.

Column 3, the first formula, that part of the formula reading "$(CF_2CF_2)_8(CH_2CH_2)_t$" should be --$(CF_2CF_2)_s(CH_2CH_2)_t$--.

Column 3, line 40, "mater" should be --matter--.

Column 4, line 72, "assinged" should be --assigned--.

Column 5, line 43, delete "the reaction".

Column 6, line 3, "compoed" should be --composed--.

Column 6, line 16, "recrysatllization" should be --recrystallization--.

Column 6, line 37, after the words "Formula I" insert --above--.

Table I, Ex. 5, under "Product", at the very end add --NH--

Table I, Ex. 10, under "Product" that part of the formula reading:

"$(CF_2)_2F$
|
CF
|
$(CF_2)_2F$ "

should read

--$(CF_2)_2F$
|
CF
|
$(CF_2)_2F$ --

UNITED STATES PATENT OFFICE
CERTIFICATE OF CORRECTION

Patent No. 3,576,019    Dated April 20, 1971

Inventor(s) Richard F. Sweeney and Alson K. Price

It is certified that error appears in the above-identified patent and that said Letters Patent are hereby corrected as shown below:

Table I, Ex. 13, under "Product", that part of the formula reading:

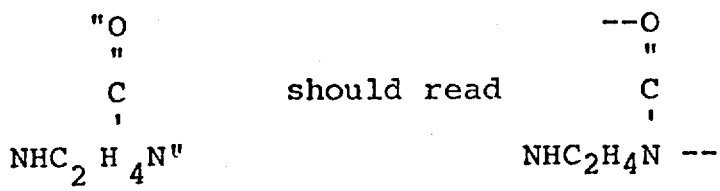

Table I, Ex. 14, under "Product", that part of the formula reading:

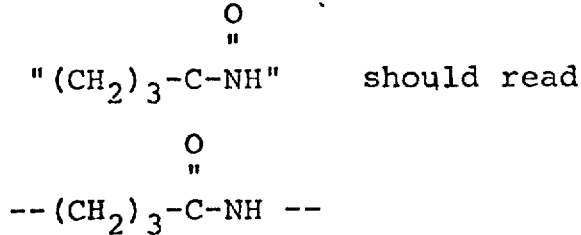

Table I, Ex. 19, under "Product", that part of the formula reading:

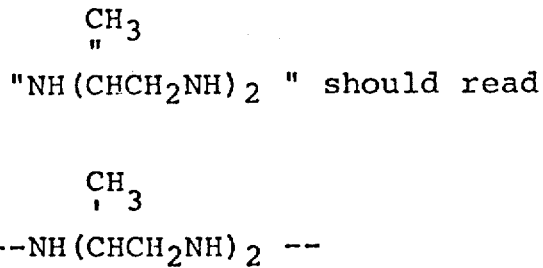

PO-1050 (5/69)

UNITED STATES PATENT OFFICE
CERTIFICATE OF CORRECTION

Patent No. 3,576,019　　　　　　　　　Dated April 20, 1971

Inventor(s) Richard F. Sweeney and Alson K. Price

It is certified that error appears in the above-identified pate and that said Letters Patent are hereby corrected as shown below:

Table I, Ex. 21, under "Polyalkylene Polyamide Reactant", part of the formula reading:

"$NCH_2CH_2NH_2$
|
$CH_2CH_2NH_2$" should read

-- $NCH_2CH_2NH_2$
　|
　$CH_2CH_2NH_2$ --

Table I, Ex. 21, under "Product", that part of the formula reading:

"$\overset{O}{\underset{\|}{-C-}}(CF_2)_3$"　　should read　　$-\overset{O}{\underset{\|}{C}}-(CF_2)_3$ --

Column 14, claim 1, in the 2nd formula:

"P-C-O-"　　should read　　-- F-C-O- --.

Signed and sealed this 27th day of March 1973.

(SEAL)
Attest:

EDWARD M. FLETCHER, JR.　　　　　　　　ROBERT GOTTSCHALK
Attesting Officer　　　　　　　　　　　　Commissioner of Patents